(12) United States Patent
Okada

(10) Patent No.: US 8,332,568 B2
(45) Date of Patent: Dec. 11, 2012

(54) MEMORY ACCESS DETERMINATION CIRCUIT, MEMORY ACCESS DETERMINATION METHOD AND ELECTRONIC DEVICE

(75) Inventor: Kazuhiko Okada, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 214 days.

(21) Appl. No.: 12/705,666

(22) Filed: Feb. 15, 2010

(65) Prior Publication Data

US 2010/0217914 A1    Aug. 26, 2010

(30) Foreign Application Priority Data

Feb. 25, 2009    (JP) .................................... 2009-42687

(51) Int. Cl.
*G06F 12/00*    (2006.01)
*G06F 12/08*    (2006.01)

(52) U.S. Cl. .................... 711/3; 711/141; 711/E12.001; 711/E12.026

(58) Field of Classification Search .............. 711/3, 141, 711/E12.001, E12.026
See application file for complete search history.

(56) References Cited

U.S. PATENT DOCUMENTS

2006/0047883 A1 *   3/2006   O'Connor et al. ................ 711/3

FOREIGN PATENT DOCUMENTS

JP    H09-259040 A    10/1997

* cited by examiner

*Primary Examiner* — Yong Choe
(74) *Attorney, Agent, or Firm* — Fujitsu Patent Center

(57) ABSTRACT

A memory access determination circuit includes a counter that outputs a first value counted by using a first reference value, and a control unit that makes a cache determination of an address corresponding to an output of the counter, wherein, when a cache miss occurs for the address, the counter outputs a second value by using a second reference value.

20 Claims, 17 Drawing Sheets

FIG. 11

| COUNT VALUE | READ ADDRESS |
|---|---|
| 0 | 0 |
| 1 | 16 |
| 2 | 32 |
| 3 | 48 |
| 4 | 64 |
| 5 | 80 |
| 6 | 96 |
| 7 | 112 |
| 8 | 128 |
| 9 | 144 |
| 10 | 160 |

FIG. 14

| COUNT VALUE | READ ADDRESS |
|---|---|
| 0 | 960 |
| 1 | 896 |
| 2 | 832 |
| 3 | 768 |
| 4 | 704 |
| 5 | 640 |
| 6 | 576 |
| 7 | 512 |
| 8 | 448 |
| 9 | 384 |
| 10 | 320 |

MEMORY ACCESS DETERMINATION CIRCUIT, MEMORY ACCESS DETERMINATION METHOD AND ELECTRONIC DEVICE

CROSS-REFERENCE TO RELATED APPLICATION

This application is based upon and claims the benefit of priority of the prior Japanese Patent Application No. 2009-042687 filed on Feb. 25, 2009, the entire contents of which are incorporated herein by reference.

FIELD

The embodiments discussed herein relate to a memory access determination circuit, a memory access determination method, and an electronic device.

BACKGROUND

A cache memory device that includes a main memory and a cache memory and pre-reads data at a look-ahead address from the main memory into the cache memory has been known. Determining, for example, a look-ahead address by an address calculation circuit based on cache control information accompanying data in such a device is currently being discussed (see, for example, Japanese Laid-open Patent Publication No. 9-259040).

According to conventional technology, it is necessary to add cache control information to data as a means to improve the hit ratio of cache and thus, more memory is needed for the added information and access efficiency to the memory falls. Thus, data processing is delayed. When it is assumed that a processor accesses data, data including cache control information has no general versatility.

SUMMARY

According to an aspect of the embodiments, a memory access determination circuit includes a counter that outputs a first value counted by using a first reference value, and a control unit that makes a cache determination of an address corresponding to an output of the counter, wherein when a cache miss occurs for the address, the counter outputs a second value by using a second reference value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 11 illustrates a first relationship between a count value in the second embodiment in FIG. 4 and an address;

FIG. 14 illustrates a second relationship between the count value in the second embodiment in FIG. 4 and the address;

DESCRIPTION OF EMBODIMENTS

Figure 1:
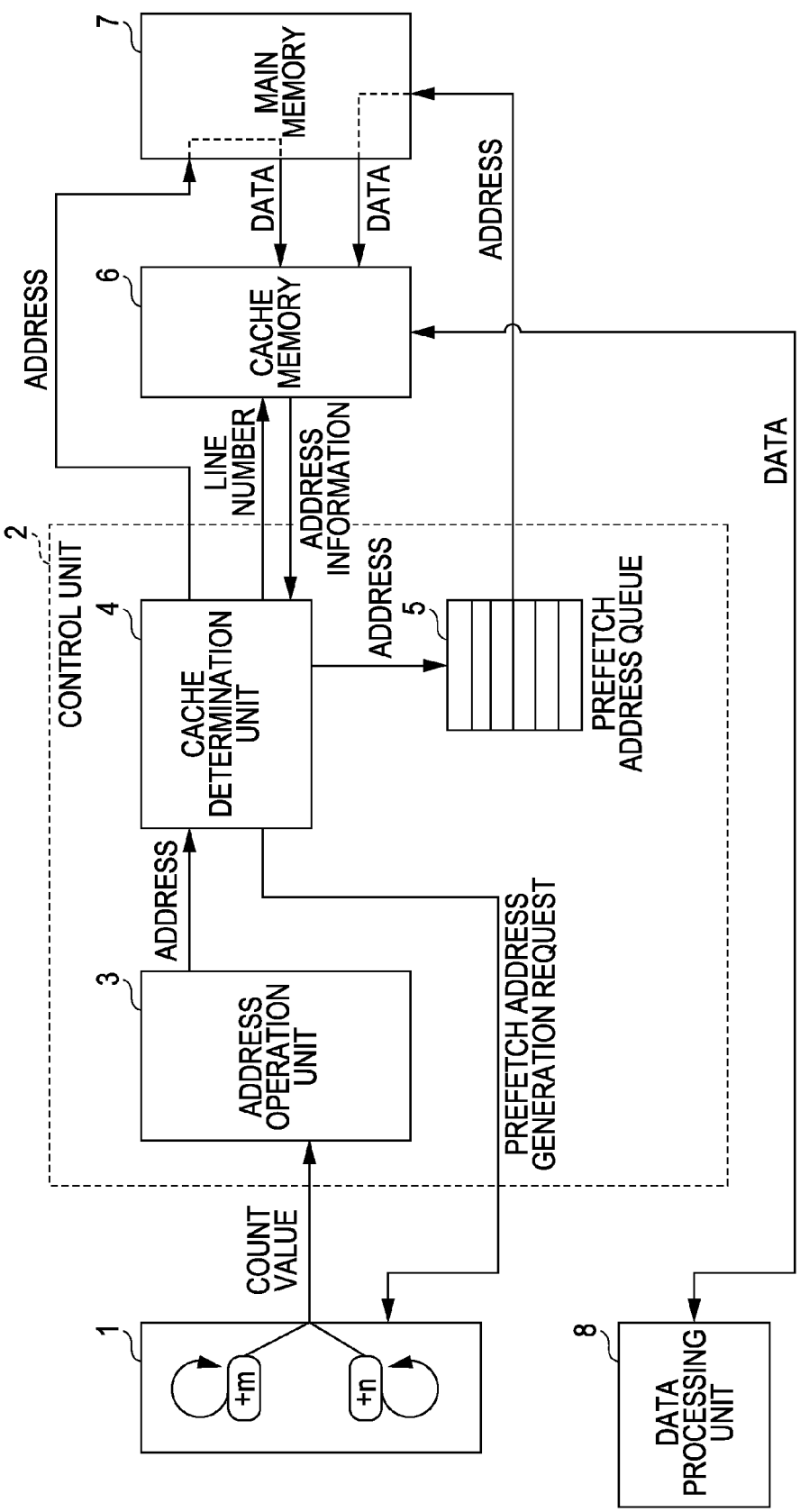
FIG. 1 illustrates a first embodiment.

FIG. 1 illustrates a first embodiment. As illustrated in FIG. 1, a memory access determination circuit includes a counter 1 and a control unit 2. The control unit 2 includes an address operation unit 3, a cache determination unit 4, and a prefetch address queue 5. An electronic device including the memory access determination circuit includes a cache memory 6, a main memory 7, and a data processing unit 8.

The counter 1 counts a value based on a first reference value m. When a prefetch address generation request is received from the cache determination unit 4, the counter 1 counts the value based on a second reference value n. Here, m and n are not equal. n may be an integer greater than m. For example, m and n may be values corresponding to the number of cycles. In this case, the counter 1 counts the value to determine an address of data needed after m cycles or n cycles. The counter 1 sends the resulting count value to the address operation unit 3.

The address operation unit 3 determines an address corresponding to the count value received from the counter 1. When an address is determined, the address may be determined from the count value by calculation using an operation formula indicating the correspondence between the count value and the address, or the address corresponding to the count value may be determined by referring to a lookup table showing the correspondence between the count value and address. The operation formula or lookup table is set to the address operation unit 3 in advance. The address operation unit 3 sends the address to the cache determination unit 4.

The cache determination unit 4 acquires information about a plurality of addresses corresponding to all data stored in the cache memory 6. The cache determination unit 4 makes a cache determination based on information about the plurality of addresses received from the cache memory 6 to determine whether data corresponding to the address received from the address operation unit 3 is stored in the cache memory 6. When the applicable data is stored in the cache memory 6, a cache hit occurs, and if applicable data is not stored in the cache memory 6, a cache miss occurs. When the cache determination unit 4 determines that a cache hit has occurred, the cache determination unit 4 sends a line number indicating the storage location of the applicable data to the cache memory 6. When the cache determination unit 4 determines that a cache miss has occurred, the cache determination unit 4 accesses the main memory 7 at the address determined to be a cache miss. When a cache miss is determined, the cache determination unit 4 sends a prefetch address generation request to the counter 1. When the cache determination unit 4 determines that a cache miss has occurred for an address sent from the address operation unit 3 caused by a prefetch address generation request being output, the cache determination unit 4 stores the applicable address in the prefetch address queue 5.

The prefetch address queue 5 chronologically sends stored addresses to the main memory 7 starting from the oldest stored address. The main memory 7 sends data stored at the address received from the cache determination unit 4 to the cache memory 6. The main memory 7 sends the data stored at the address received from the prefetch address queue 5 to the cache memory 6. During data transfer from the main memory 7 to the cache memory 6, an operation attributed to the address from the cache determination unit 4 and an operation attributed to the address from the prefetch address queue 5 may compete. When a competition occurs, it is preferable to give priority to the data transfer operation attributed to the address from the cache determination unit 4 to speed up processing in the data processing unit 8. That is, it is preferable to perform the data transfer operation attributed to the address from the prefetch address queue 5 after the data transfer operation attributed to the address from the cache determination unit 4 is completed.

The cache memory 6 stores data sent from the main memory 7. The cache memory 6 sends data stored at the line number received from the cache determination unit 4 to the data processing unit 8. The cache memory 6 sends data, sent from the main memory 7 attributed to the address from the cache determination unit 4, to the data processing unit 8. The main memory 7 is a memory that takes some time before data is output after access to the memory is started. For example, the main memory 7 may be a Synchronous Dynamic Random Access Memory (SDRAM). The cache memory 6 is a memory capable of reading data faster than the main memory 7. For example, the cache memory 6 may be a Static Random Access Memory (SRAM).

Figure 2:
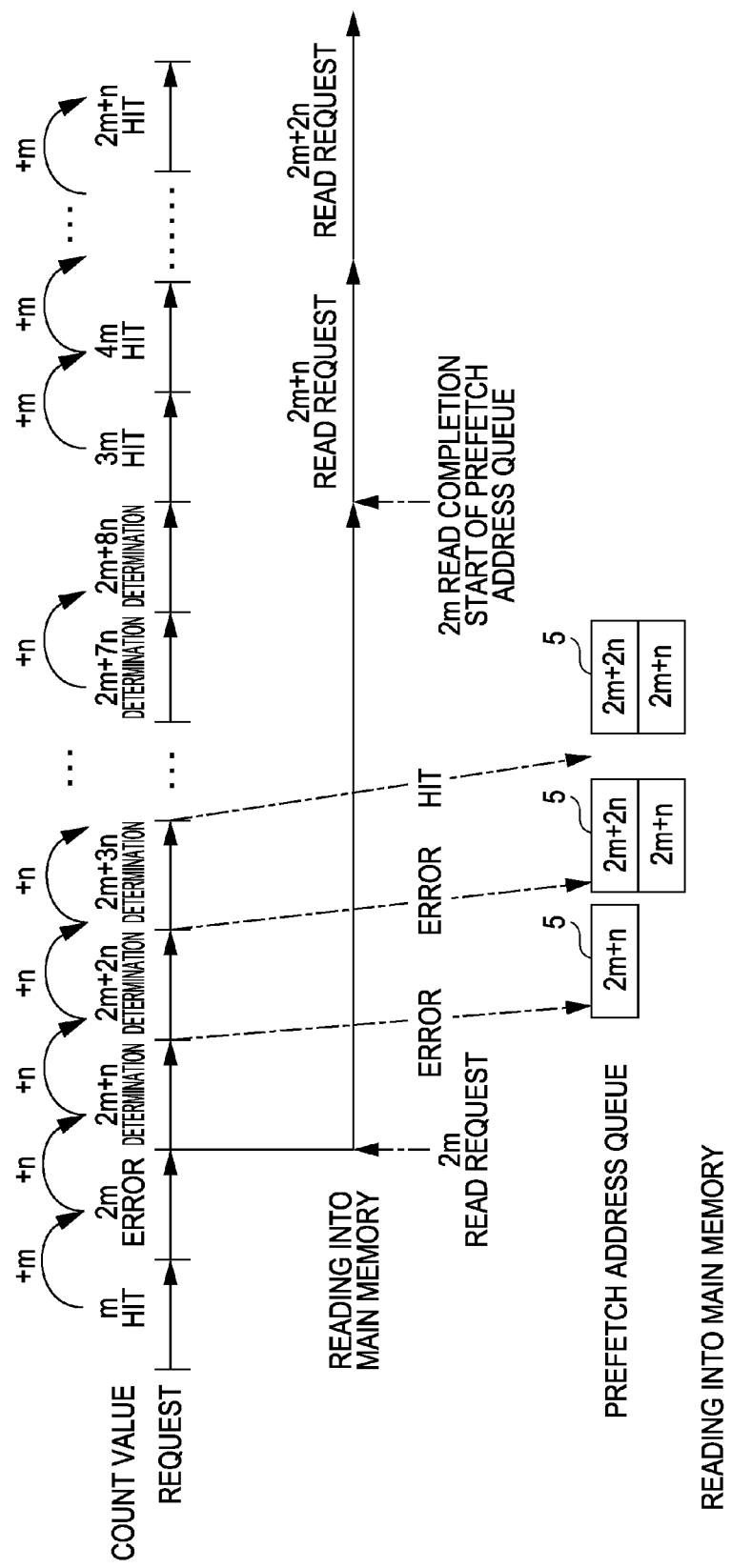
FIG. 2 illustrates an operation in the first embodiment in FIG. 1.

FIG. 2 illustrates an operation in the first embodiment in FIG. 1. As illustrated in FIG. 2, first the counter 1 starts to count using the first reference value m. The address operation unit 3 determines the address corresponding to the count value m. When, for example, a cache hit occurs for the address for the count value m, data at the address corresponding to the count value m is read from the cache memory 6 and sent to the data processing unit 8. Subsequently, m is added to the count value m to produce the count value 2m. The address operation unit 3 determines the address corresponding to the count value 2m. When, for example, a cache miss occurs for the address for the count value 2m, a read request is made to the main memory 7 at the address corresponding to the count value 2m and reading data from the main memory 7 is started.

While data is being read from the main memory 7, the counter 1 switches the first reference value m to the second reference value n based on an output of a prefetch address generation request, and continues to count using the second reference value n. Therefore, the count value becomes 2m+n. At this point, the counter 1 holds the count value, 2m in FIG. 2, when the first reference value m is switched to the second reference value n. The address operation unit 3 determines the address corresponding to the count value 2m+n. When, for example, a cache miss occurs for the address for the count value 2m+n, the address for the count value 2m+n is stored in the prefetch address queue 5.

In FIG. 2, a cache miss also occurs for the address for the count value 2m+2n after n is further added and thus, the address for the count value 2m+2n is also stored in the prefetch address queue 5. Therefore, the prefetch address queue 5 has the address for the count value 2m+n and the address for the count value 2m+2n stored therein in chronological order of storage. In FIG. 2, a cache hit occurs for the address for the count value 2m+3n after n is further added. Therefore, the address for the count value 2m+3n is not stored in the prefetch address queue 5. So, while data at the address corresponding to the count value 2m is being read, addresses are prefetched.

When data at the address corresponding to the count value 2m is stored in the cache memory 6, the reading of data at the address corresponding to the count value 2m and the prefetch operation of addresses terminate. The counter 1 brings the count value back to the value previously held, 2m in FIG. 2. Then, the counter 1 switches the second reference value n back to the first reference value m to continue to count using the first reference value m. Therefore, the count value becomes 3m and the address operation unit 3 determines the address corresponding to the count value 3m. Hereinafter, the cache determination may be made based on the value counted by using the first reference value m. While the counter 1 continues to count using the first reference value m, data corresponding to addresses stored in the prefetch address queue 5 is sequentially read from the main memory 7 and stored in the cache memory 6 in parallel therewith. When a cache miss occurs while the counter 1 continues to count using the first reference value m, like the cache miss for the count value 2m described above, the operations to read data from the main memory 7 and to store the data in the cache memory 6, and the operation to prefetch an address while reading the data are performed.

The memory access determination circuit in the first embodiment may be realized not only by hardware, but also by software. For example, similar operations as performed by the above memory access determination circuit may be realized by a memory access determination processing program being performed by a central processing unit (CPU). The memory access determination processing program may be stored in a nonvolatile memory such as a Read Only Memory (ROM) accessible by the CPU. A procedure for memory access determination processing will be described below.

Figure 3:
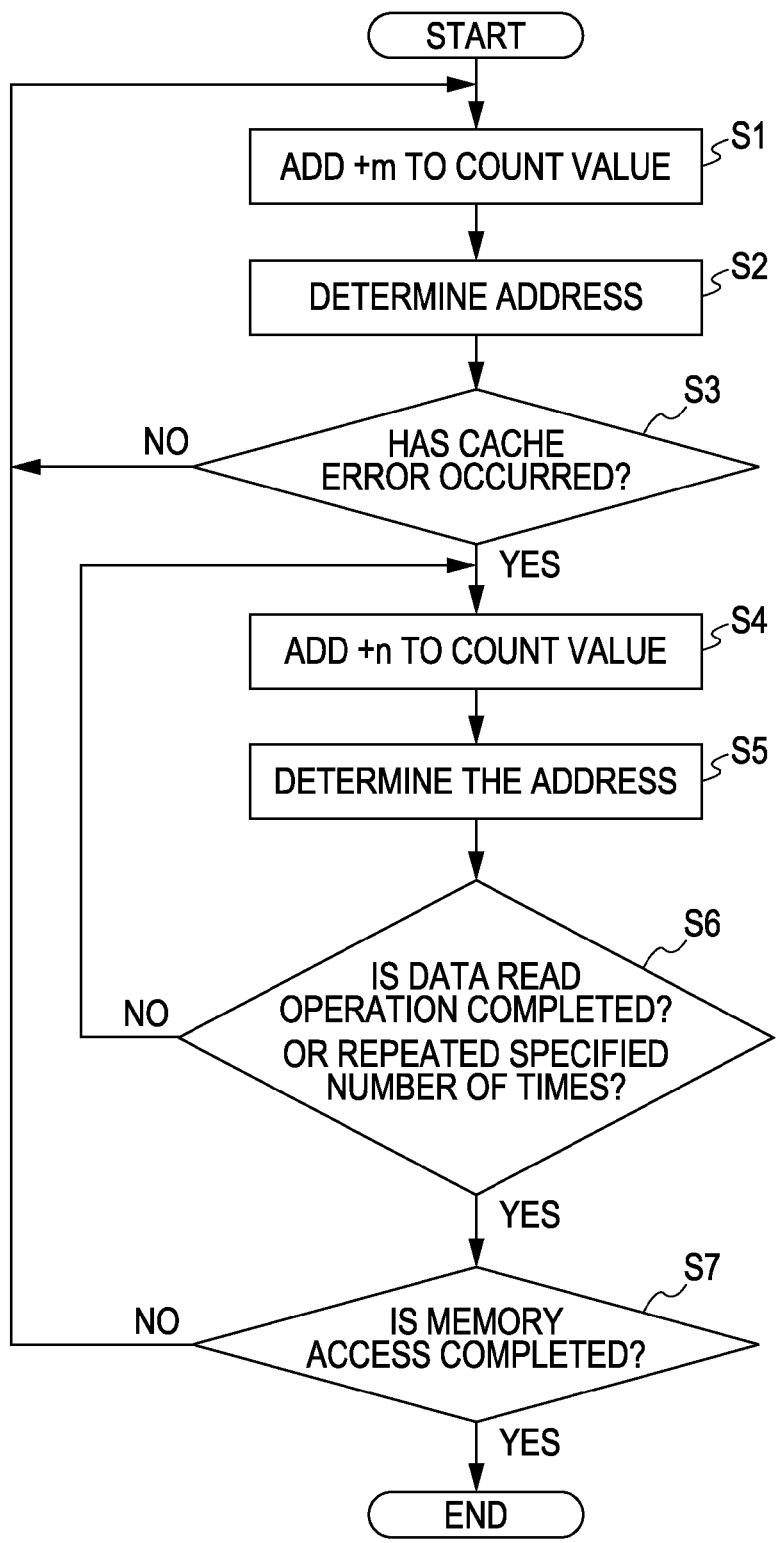
FIG. 3 illustrates a flow chart of the operation in the first embodiment in FIG. 1.

FIG. 3 illustrates a flow chart of the operation in the first embodiment in FIG. 1. As illustrated in FIG. 3, when the memory access determination processing is started, counting is started using the first reference value m (step S1). An address corresponding to the count value is determined by calculation (step S2). Alternatively, the address corresponding to the count value may be determined by referring to a lookup table. A cache determination of the address corresponding to the count value is made (step S3). When a cache hit is determined (step S3: No), data at the address corresponding to the count value m is read from the cache memory 6 and sent to the data processing unit 8. The count value is produced by adding the first reference value m, and the address is calculated and the cache determination is made in the similar manner (step S1 to step S3).

When a cache miss is determined at step S3 (step S3: Yes), data at the address corresponding to the cache miss is read from the main memory 7 and stored in the cache memory 6. During the time between the start of access to the main memory 7 and completion of storage of the data in the cache memory 6, the first reference value m is switched to the second reference value n and the second reference value n is added to the count value (step S4). At this point, the counter 1 holds the count value when the first reference value m is switched to the second reference value n. The address corresponding to the count value is determined (step S5). When a cache miss occurs for the address determined at step S5, the applicable address is stored in the queue. Whether a read operation of data from the main memory 7 performed due to an occurrence of a cache miss at step S3 is completed or not is determined (step S6).

When the read operation of data is not completed (step S6: No), step S4 to step S6 are repeated until the reading of data is completed or until counting using the second reference value n is completed a preset number of times after the first reference value m is switched to the second reference value n. When the reading of data is completed (step S6: Yes), whether memory access processing is completed is determined (step S7). When the processing is not completed (step S7: No), the count value is brought back to the count value held when the first reference value m is switched to the second reference value n. Also, the second reference value n is brought back to the first reference value m. Counting is started using the first reference value m, the address is calculated, and a cache determination is made (step S1 to step S3). In parallel therewith, data corresponding to addresses held in the queue is read from the main memory 7 and stored in the cache memory 6 at step S4 to step S6. When memory access processing is completed at step S7 (step S7: Yes), the memory access determination processing terminates.

According to the first embodiment, an address corresponding to the value counted based on the first reference value m is generated and thus, cache determinations for data having continuity may be made faster. Therefore, processing for data having continuity may be made faster. Moreover, while the main memory 7 is accessed after a cache miss occurs, an address corresponding to the value counted based on the second reference value n is prefetched. Data corresponding to the prefetched address is read from the main memory 7 and stored in the cache memory 6 after access to the main memory 7 due to the cache miss is completed and thus, the probability of cache hits in subsequent cycles increases. Therefore, processing for data having continuity may be made faster. Examples of data having continuity include, for example, image data. Thus, image data may be processed faster by applying the first embodiment to processing of the image data.

Figure 4:
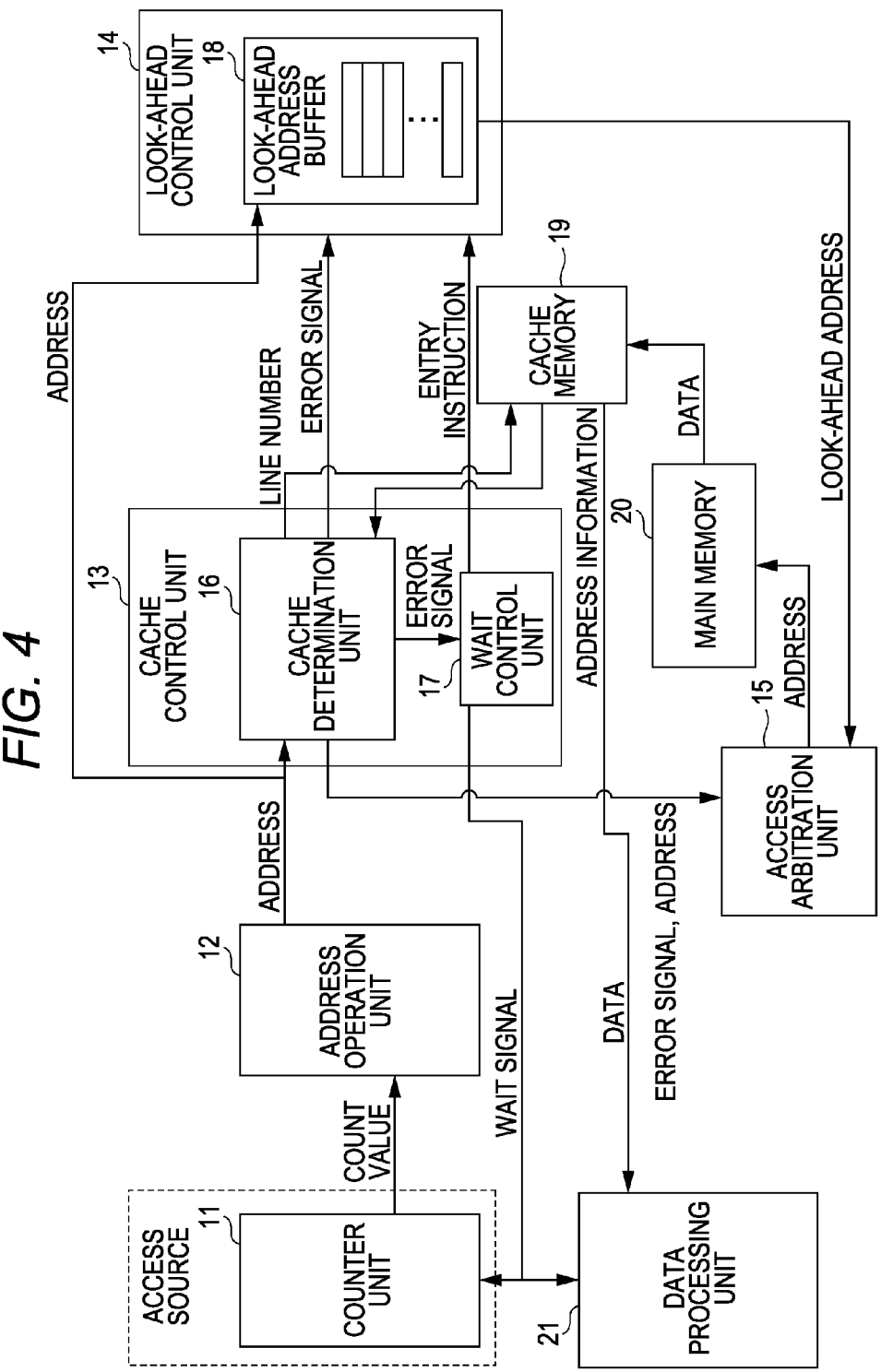
FIG. 4 illustrates a second embodiment.

FIG. 4 illustrates the second embodiment. As illustrated in FIG. 4, the memory access determination circuit includes a counter unit 11, an address operation unit 12, a cache control unit 13, a look-ahead control unit 14, and an access arbitration unit 15. The cache control unit 13 includes a cache determination unit 16 and a wait control unit 17. The look-ahead control unit 14 includes a look-ahead address buffer 18. The address operation unit 12, the cache control unit 13, the look-ahead control unit 14, and the access arbitration unit 15 operate as control units. An electronic device including the memory access determination circuit includes a cache memory 19, a main memory 20, and a data processing unit 21.

The counter unit 11 is generally set up in an access source of data. A wait signal is input into the counter unit 11 from the wait control unit 17. When the wait signal is negated, the counter unit 11 counts the value based on the first reference value m and when the wait signal is asserted, the counter unit 11 counts the value based on the second reference value n. The first reference value m and the second reference value n are as described in the first embodiment. The counter unit 11 sends the count value to the address operation unit 12. Detailed configuration of the counter unit 11 will be described below.

The address operation unit 12 determines an address corresponding to the count value received from the counter unit 11 using, like the first embodiment, an operation formula or lookup table. The address operation unit 12 sends the address to the cache determination unit 16 and the look-ahead address buffer 18.

The cache determination unit 13 makes a cache determination and exercises control of counter switching and data look-ahead when a cache miss occurs. The cache determination unit 16 acquires information about a plurality of addresses corresponding to all data stored in the cache memory 19. The cache determination unit 16 makes a cache determination of the address received from the address operation unit 12 based on information about the plurality of addresses received from the cache memory 19. When the determination result is a cache hit, the cache determination unit 16 negates an error signal and also sends a line number to the cache memory 19. When the determination result is a cache miss, the cache determination unit 16 asserts an error signal and also sends the address determined to be a cache miss to the access arbitration unit 15 as a memory access request.

When an error signal is asserted, the wait control unit 17 asserts the wait signal and also gives instructions to the look-ahead control unit 14 to enter a look-ahead address. The wait signal maintains an asserted state until data of an address causing the wait signal to be asserted is read from the main memory 20 and stored in the cache memory 19. When data of an address causing the wait signal to be asserted is stored in the cache memory 19, the wait signal is negated. While the wait signal is asserted, a look-ahead address entry is instructed, and while the wait signal is negated, the instruction of the look-ahead address entry is withdrawn.

The look-ahead control unit 14 controls a look-ahead operation. When an error signal is asserted and instructions to enter a look-ahead address are given, the look-ahead control unit 14 stores the address output from the address operation unit 12 in the look-ahead address buffer 18 as a look-ahead address. The look-ahead control unit 14 sends look-ahead addresses stored in the look-ahead address buffer 18 to the access arbitration unit 15 in chronological order of storage. The look-ahead address buffer 18 includes, for example, a First-In First-Out (FIFO) system memory.

When, for example, a memory access request from the cache determination unit 16 and a memory access request for look-ahead from the look-ahead address buffer 18 compete, the access arbitration unit 15 gives priority to the memory access request from the cache determination unit 16. Accordingly, data needed by the data processing unit 21 is immediately read from the main memory 20 and stored in the cache memory 19. Therefore, processing by the data processing unit 21 may be made faster than giving priority to memory access based on a look-ahead address. The memory access request for look-ahead is processed after the memory access request from the cache determination unit 16 is processed. When a memory access request from the cache determination unit 16 is accepted, the access arbitration unit 15 does not accept any new memory access request from the cache determination unit 16 until transfer of data due to the memory access request is completed. The cache memory 19 and the main memory 20 are as described in the first embodiment.

Figure 5:
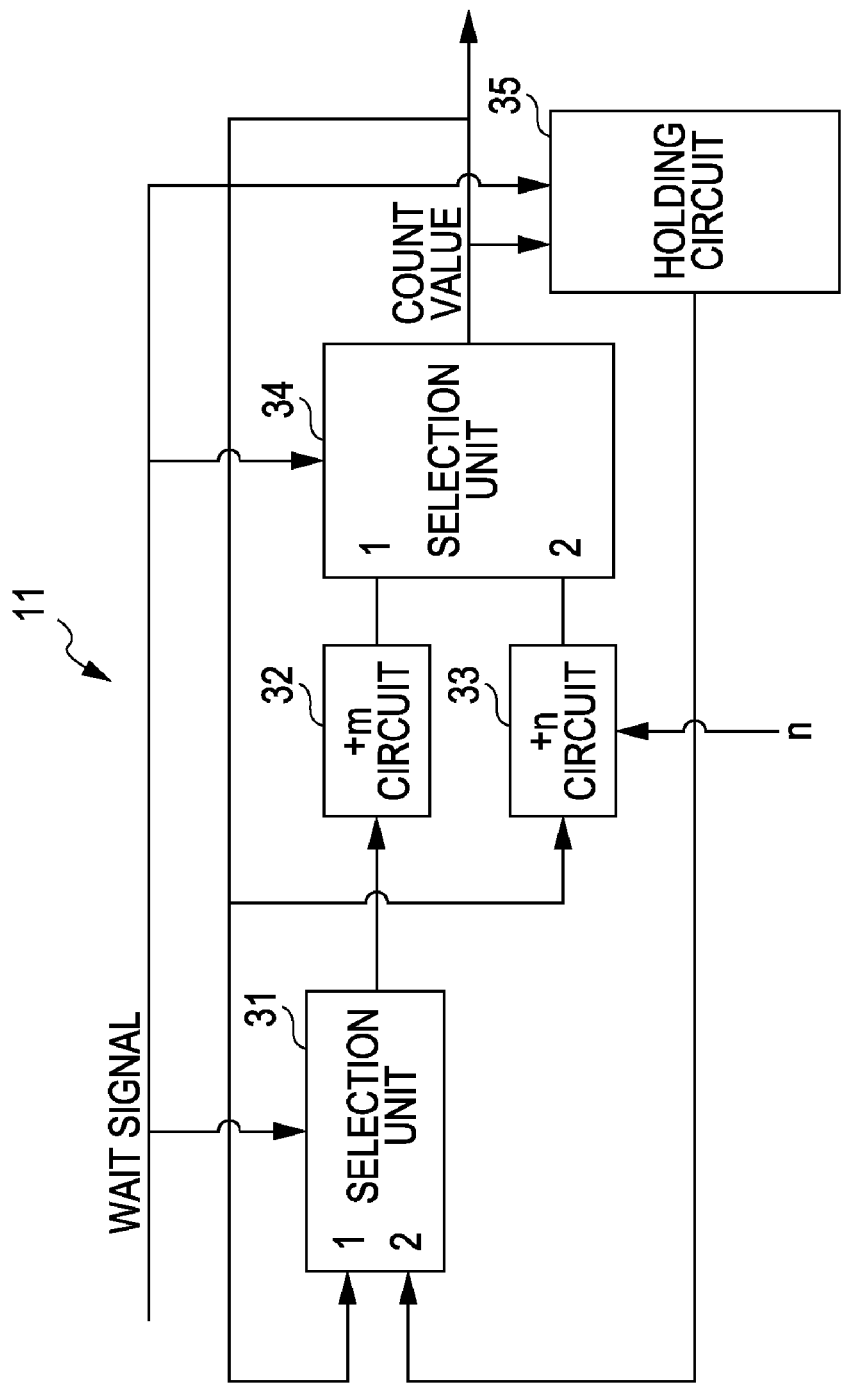
FIG. 5 illustrates a first example of a counter unit 11 in the second embodiment in FIG. 4.

FIG. 5 illustrates a first example of the counter unit 11 in the second embodiment in FIG. 4. As illustrated in FIG. 5, the counter unit 11 includes a first selection unit 31, a +m circuit 32, a +n circuit 33, a second selection unit 34, and a holding circuit 35. The first selection unit 31 selects an output value of the holding circuit 35 when a wait signal is in a cycle switching from an asserted state to a negated state ("2" side), or otherwise, selects the count value output from the second selection unit 34 ("1" side). The +m circuit 32 adds the first reference value m to the output value of the first selection unit 31. The +n circuit 33 adds the second reference value n to the count value output from the second selection unit 34. Any value may be set as the value of n from outside such as a CPU.

The second selection unit 34 selects the output value of the +n circuit 33 when the wait signal is in an asserted state ("2" side) and the output value of the +m circuit 32 when the wait signal is in a negated state ("1" side). The second selection unit 34 outputs the value on the selected side of the output value of the +n circuit 33 and the value on the selected side of the output value of the +m circuit 32 to the address operation unit 12 as a count value. The holding circuit 35 holds the count value output from the second selection unit 34 in a cycle in which the wait signal switches from a negated state to an asserted state.

Figure 6:
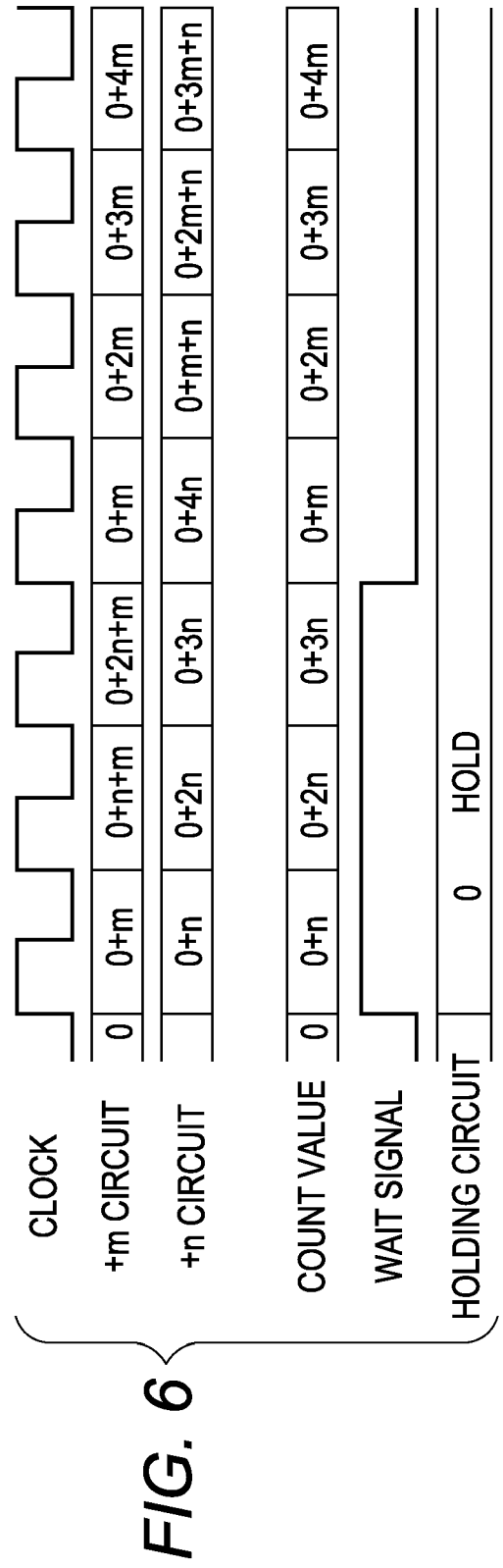
FIG. 6 illustrates an operation of the first example in FIG. 5 of the counter unit 11 in FIG. 4.

FIG. 6 illustrates an operation of the first example in FIG. 5 of the counter unit 11 in FIG. 4. As illustrated in FIG. 6, when the wait signal is switched from a negated state to an asserted state (rise time of the wait signal in FIG. 6), the count value (0 in FIG. 6) is held by the holding circuit 35. In a period in which the wait signal is in an asserted state, a value obtained by the second reference value n being added by the +n circuit 33 to the count value in the previous cycle is output as the count value. When the wait signal is switched from an asserted state to a negated state (fall time of the wait signal in FIG. 6), the value held in the holding circuit 35 (0 in FIG. 6) is returned. In the next cycle, a value (0+m in FIG. 6) obtained by the first reference value m being added by the +m circuit 32 to the returned value (0 in FIG. 6) is output as the count value. In a period in which the wait signal is in a negated state, a value obtained by the first reference value m being added by the +m circuit 32 to the count value in the previous cycle is output as the count value.

Figure 7:
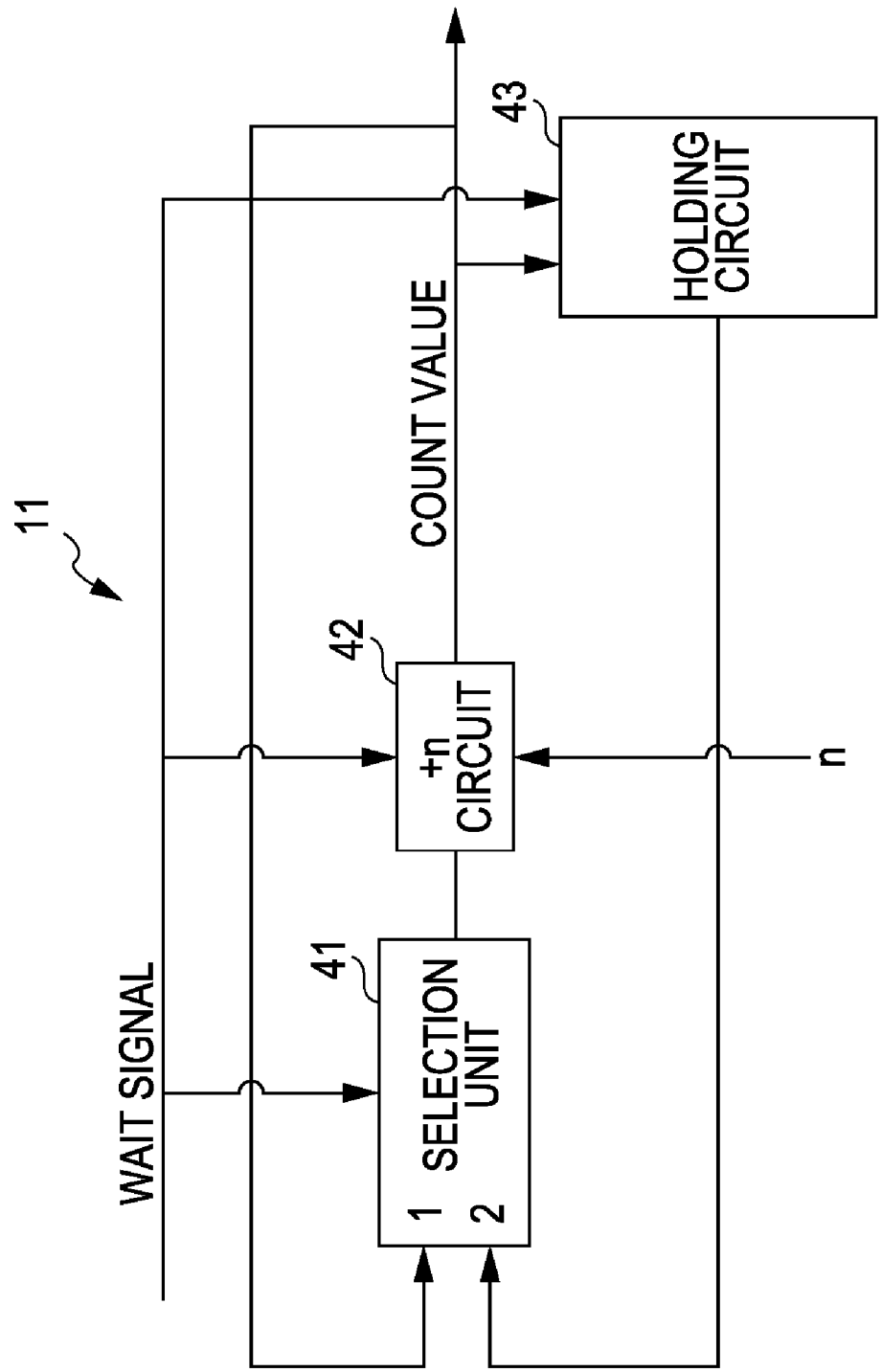
FIG. 7 illustrates a second example of the counter unit 11 in FIG. 4.

FIG. 7 illustrates a second example of the counter unit 11 in FIG. 4. As illustrated in FIG. 7, the counter unit 11 includes a selection unit 41, a +n circuit 42, and a holding circuit 43. The selection unit 41 selects the output value of the holding circuit 43 in a cycle in which the wait signal switches from an asserted state to a negated state ("2" side), or, otherwise, selects the count value output from the +n circuit 42 ("1" side). When the wait signal is in a negated state, the +n circuit 42 adds the first reference value m to the output value of the selection unit 41 and outputs the resultant value to the address operation unit 12 as the count value. When the wait signal is in an asserted state, the +n circuit 42 adds the second reference value n to the output value of the selection unit 41 and outputs the resultant value to the address operation unit 12 as the count value. Any value may be set as the value of n from outside such as a CPU. The holding circuit 43 holds the count value output from the +n circuit 42 in the cycle in which the wait signal switches from a negated state to an asserted state.

Figure 8:
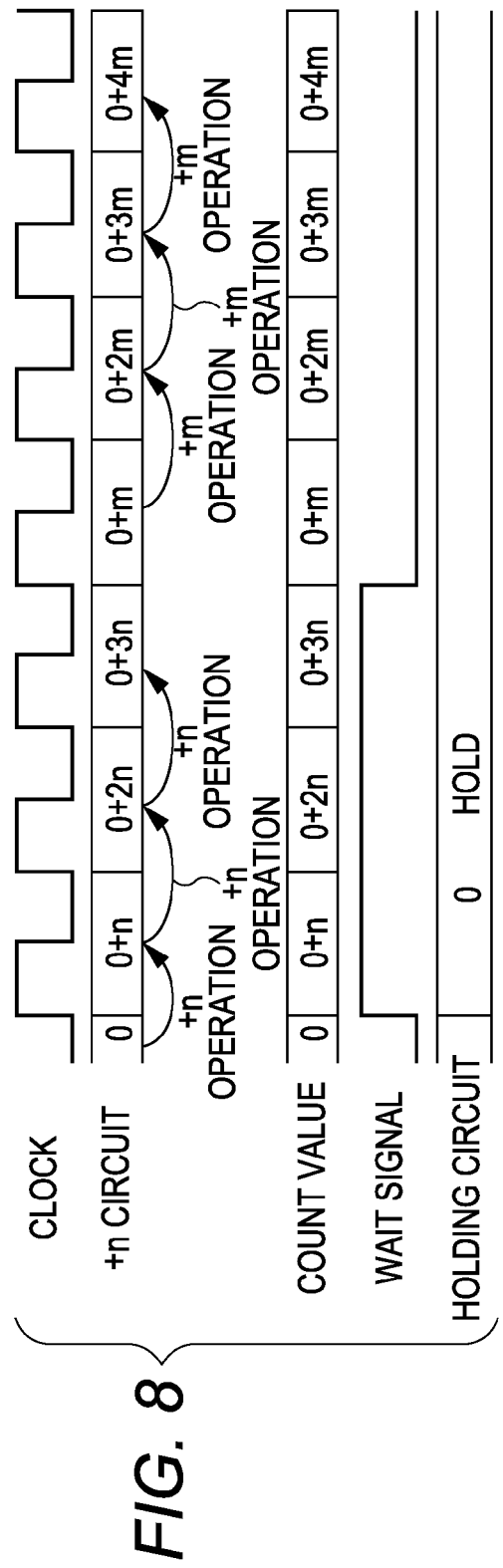
FIG. 8 illustrates an operation of the second example in FIG. 7 of the counter unit 11 in FIG. 4.

FIG. 8 illustrates an operation of the second example in FIG. 7 of the counter unit 11 in FIG. 4. As illustrated in FIG. 8, the count value (0 in FIG. 8) when the wait signal is switched from a negated state to an asserted state (rise time of the wait signal in FIG. 8) is held by the holding circuit 43. In a period in which the wait signal is in an asserted state, a value obtained by the second reference value n being added by the +n circuit 42 to the count value in the previous cycle is output as the count value. When the wait signal is switched from an asserted state to a negated state (fall time of the wait signal in FIG. 8), the value held in the holding circuit 43 (0 in FIG. 8) is returned. In the next cycle, a value (0+m in FIG. 8) obtained by the first reference value m being added by the +n circuit 42 to the returned value (0 in FIG. 8) is output as the count value. In a period in which the wait signal is in a negated state, a value obtained by the first reference value m being added by the +n circuit 42 to the count value in the previous cycle is output as the count value.

Figure 9:
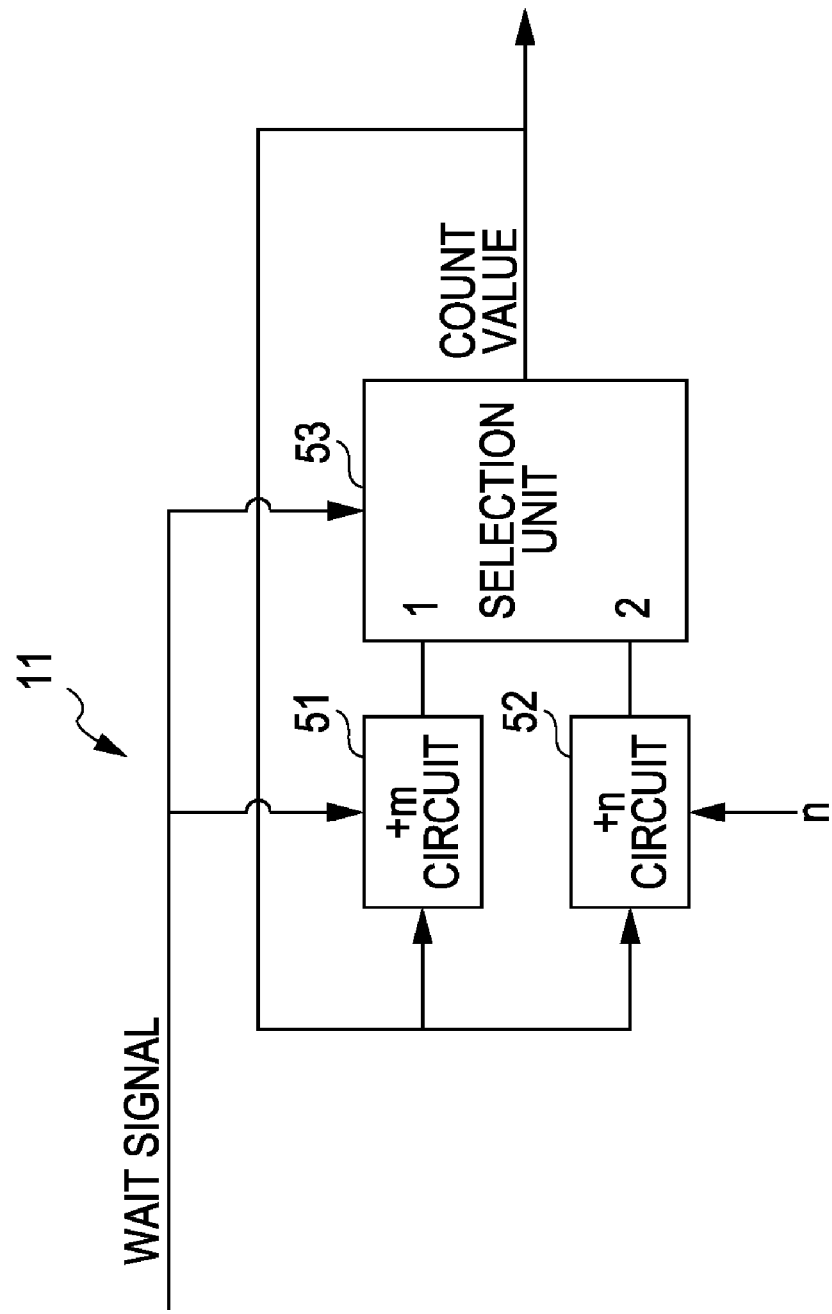
FIG. 9 illustrates a third example of the counter unit in FIG. 4.

FIG. 9 illustrates a third example of the counter unit 11 in FIG. 4. As illustrated in FIG. 9, the counter unit 11 includes a +m circuit 51, a +n circuit 52, and a selection unit 53. When the wait signal is in a negated state, the +m circuit 51 adds the first reference value m to the count value output from the selection unit 53. When the wait signal is in an asserted state, the +m circuit 51 stops the operation thereof and holds the count value when the operation is stopped. The +n circuit 52 adds the second reference value n to the count value output from the selection unit 53. Any value may be set as the value of n from outside such as a CPU. The selection unit 53 selects the output value of the +n circuit 52 when the wait signal is in an asserted state ("2" side) and that of the +m circuit 51 when the wait signal is in a negated state ("1" side). The selection unit 53 outputs the value on the selected side of the output value of the +n circuit 52 and that of the +m circuit 51 to the address operation unit 12 as the count value.

Figure 10:
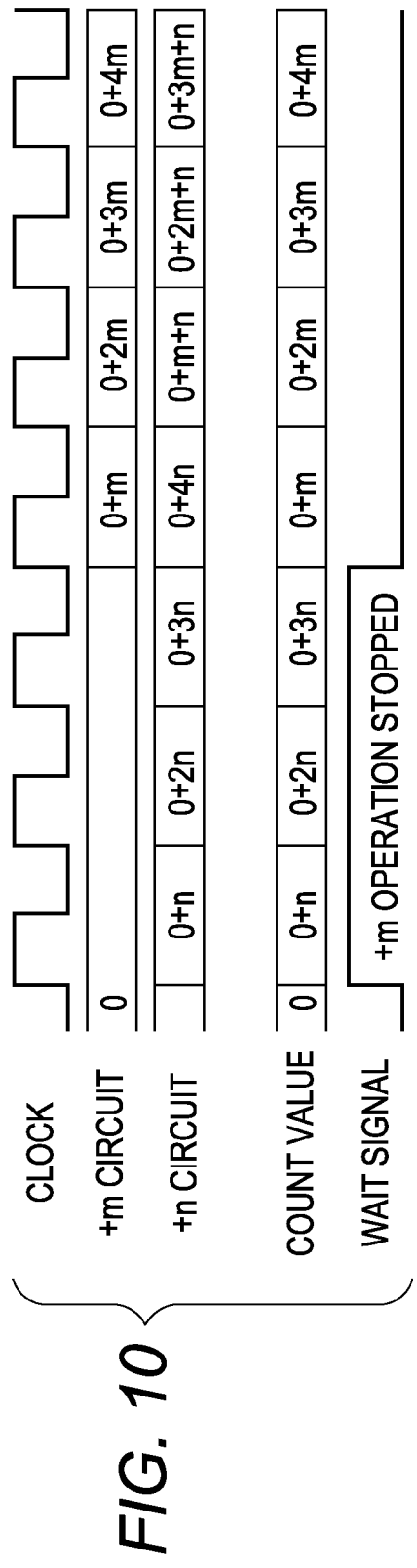
FIG. 10 illustrates an operation of the third example in FIG. 9 of the counter unit in FIG. 4.

FIG. 10 illustrates an operation of the third example in FIG. 9 of the counter unit 11 in FIG. 4. As illustrated in FIG. 10, when the wait signal is in an asserted state, the +m circuit 51 stops the operation thereof while holding the count value and outputs a value obtained by the second reference value n being added by the +n circuit 52 to the count value of the previous cycle as the count value. When the wait signal changes from an asserted state to a negated state, the +m circuit 51 restarts counting from the held value. Therefore, a value obtained by the first reference value m being added by the +m circuit 51 to the value held by the +m circuit 51 is output as the count value. In a period in which the wait signal is in a negated state, a value obtained by the first reference value m being added by the +m circuit 51 to the count value in the previous cycle is output as the count value.

FIG. 11 illustrates a first relationship between the count value in the second embodiment in FIG. 4 and the address. A case in which the first reference value m is 1 and the second reference value n is 4 is taken as an example. It is assumed, as illustrated in FIG. 11, that read addresses 0, 16, 32, 48, 64, 80, 96, 112, 128, 144, and 160 correspond to the count values 0, 1, 2, 3, 4, 5, 6, 7, 8, 9, and 10, respectively.

Figure 12:
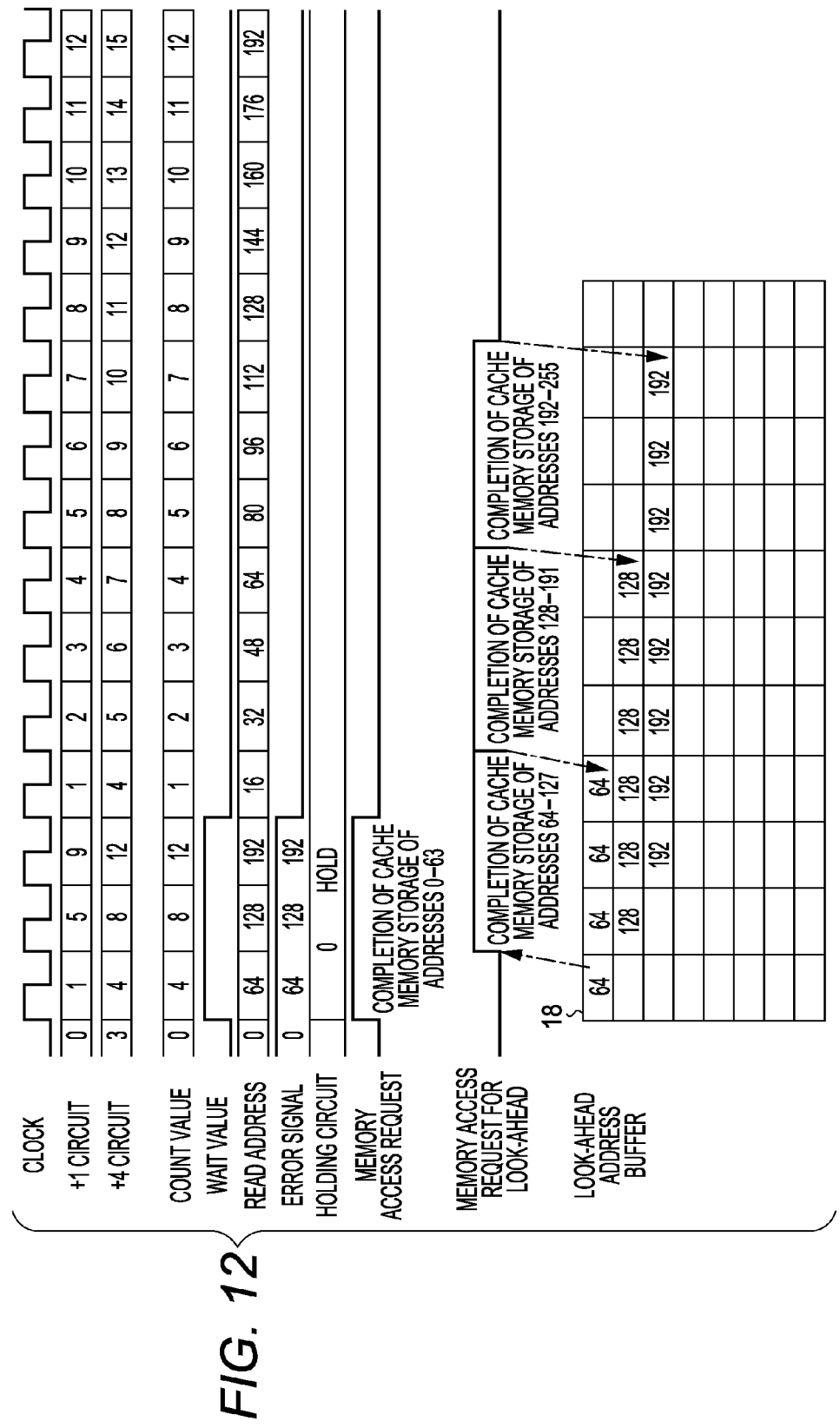
FIG. 12 illustrates an operation in the second embodiment in FIG. 4.

FIG. 12 illustrates an operation in the second embodiment in FIG. 4. Though not specifically limited, the size of one line of the cache memory 19 is assumed to be 64 bytes. Therefore, a line number given to the cache memory 19 by the cache determination unit 16 when a cache hit occurs will exist for every 64 bytes of address of the main memory 20. Moreover, the cache determination is assumed to be made in 64 bytes. It is also assumed that when a cache miss occurs, 64-byte data containing data of the address determined to be a cache miss is read from the main memory 20 and stored in the cache memory 19.

When, as illustrated in FIG. 12, the count value is 0, nothing is stored in the cache memory 19 and a cache miss is determined. Accordingly, data corresponding to read addresses 0 to 63 (see FIG. 11) is read from the main memory 20 and stored in the cache memory 19. While data corresponding to read addresses 0 to 63 is stored in the cache memory 19, the count value becomes 4 after the second reference value 4 is added. Therefore, the read address becomes 64 (see FIG. 11). Since data corresponding to the read address 64 is not stored in the cache memory 19, a cache miss is determined. Then, a read address 64 is stored in the look-ahead address buffer 18. The look-ahead control unit 14 makes a read access request of read addresses 64 to 127.

Next, the count value becomes 8 after the second reference value 4 is added and a cache miss is determined. Thus, a read address 128 (see FIG. 11) is stored in the look-ahead address buffer 18. The look-ahead control unit 14 makes a read access request of read addresses 128 to 191. Next, the count value becomes 12 and a read address 192 is similarly stored in the look-ahead address buffer 18 due to a cache miss. The look-ahead control unit 14 makes a read access request of read addresses 192 to 252. Assume that at this point, storage of data corresponding to the read addresses 0 to 63 in the cache memory 19 is completed. The count value returns to 0 and the first reference value 1 is added to this value, producing a new count value 1.

The read address corresponding to the count value 1 is 16 (see FIG. 11) and the corresponding data is already stored in the cache memory 19 and thus, a cache hit occurs. The read address when the count value is 2 is 32 (see FIG. 11) and the read address when the count value is 3 is 48 (see FIG. 11) and a cache hit occurs in both cases. The read address when the count value is 4 is 64 (see FIG. 11). Data corresponding to the read address 64 stored in the look-ahead address buffer 18 is read from the main memory 20 and stored in the cache determination unit 16 by this time and thus, a cache hit occurs. For the count values of 5 or more, corresponding data is already read from the main memory 20 and stored in the cache determination unit 16 by look-ahead and thus, a cache hit occurs.

Figure 13:
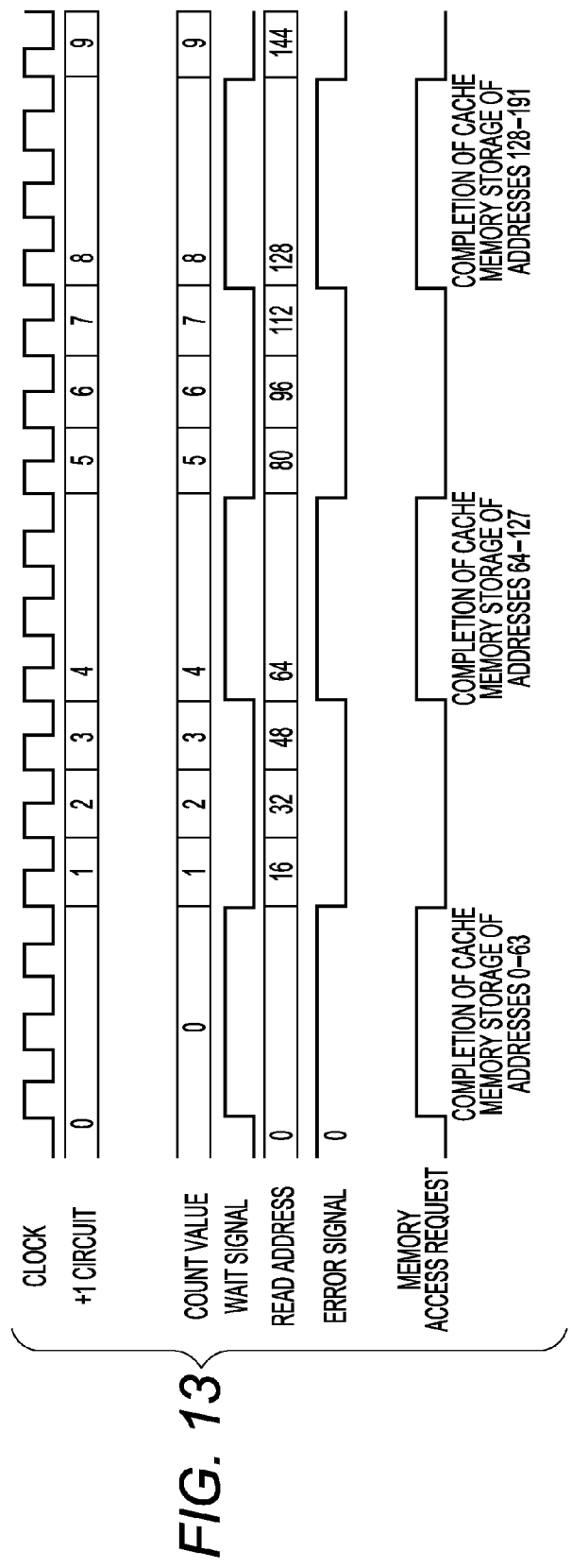
FIG. 13 illustrates the operation of a comparative example.

FIG. 13 illustrates an operation of a comparative example. The comparative example does not perform a look-ahead operation by counting using the second reference value n. Other conditions are assumed to be the similar to those of the example described with reference to FIG. 12. In the comparative example, data is read from the main memory and stored in the cache memory when the count value is 4 or 8 and thus, processing is delayed. As is evident from comparison of FIGS. 12 and 13, the second embodiment is faster than the comparative example. Therefore, according to the second embodiment, processing in the data processing unit 21 may be made faster.

FIG. 14 illustrates a second relationship between the count value in the second embodiment in FIG. 4 and the address. It is assumed, as illustrated in FIG. 14, that read addresses 960, 896, 832, 768, 704, 640, 576, 512, 448, 384, and 320 correspond to the count values 0, 1, 2, 3, 4, 5, 6, 7, 8, 9, and 10, respectively. In this case, when m and n are set to 1, efficiency of data processing is improved. An example will be illustrated in FIGS. 15 and 16.

Figure 15:
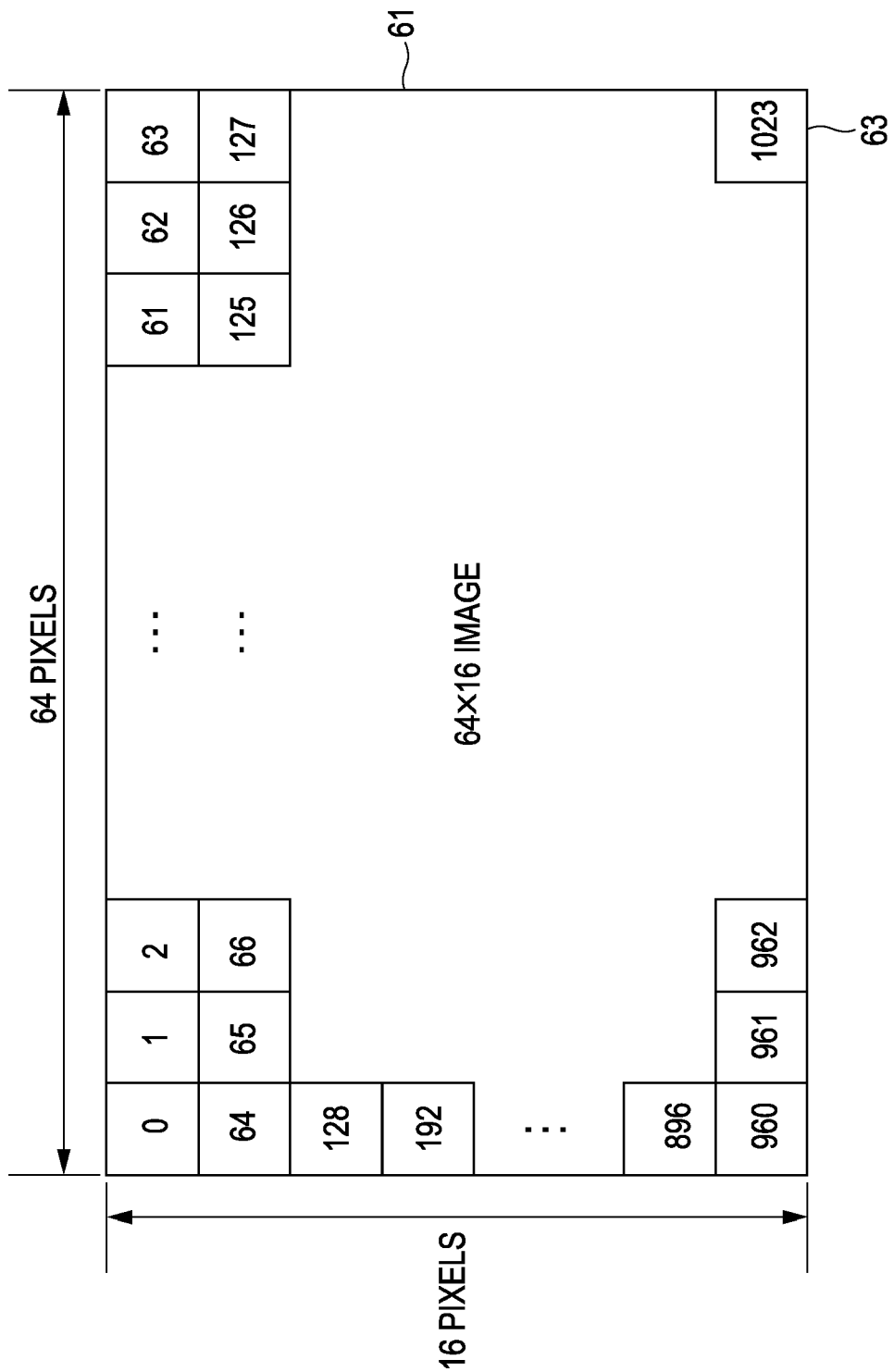
FIG. 15 illustrates an example in which image data is processed by applying the second embodiment in FIG. 4.
Figure 16:
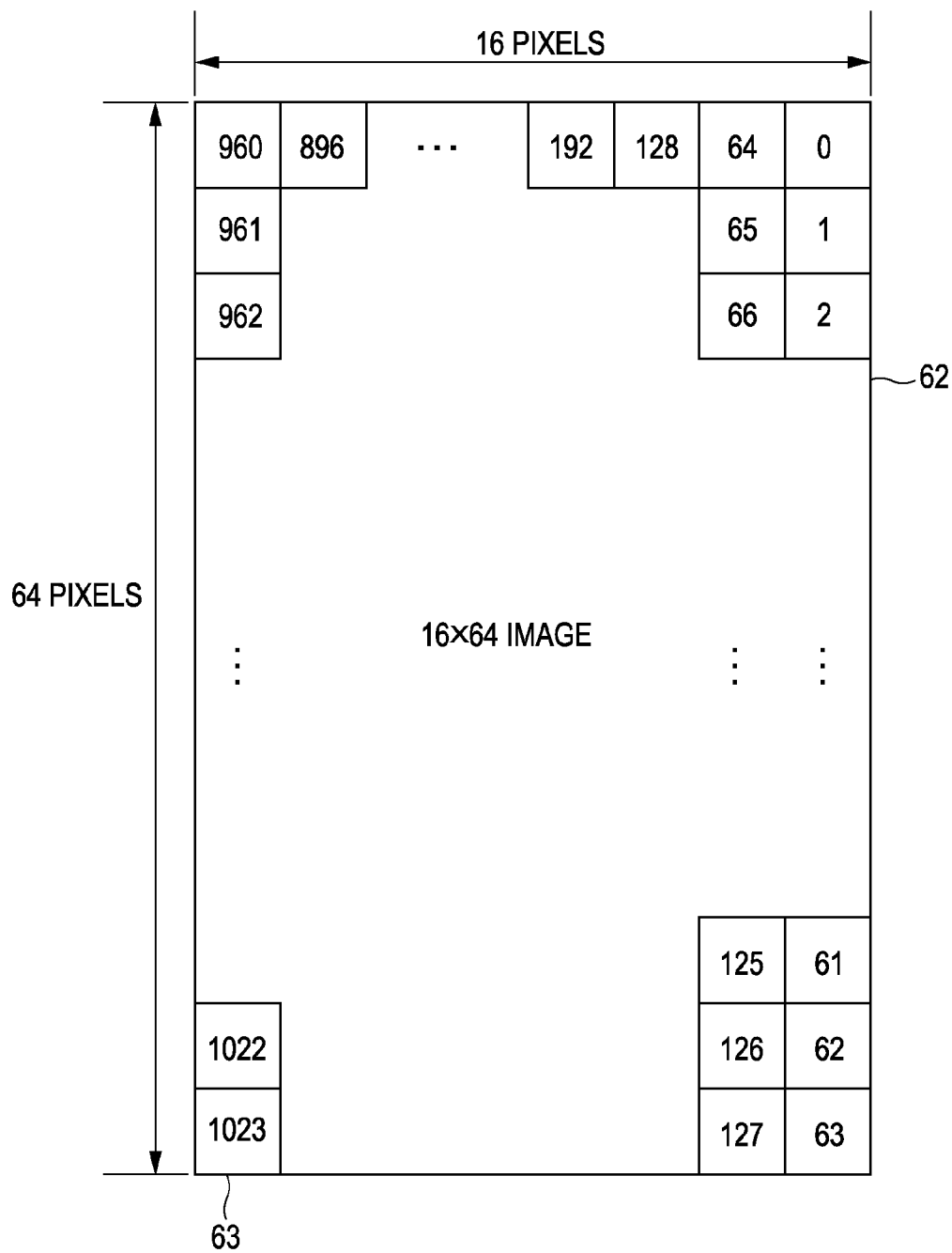
FIG. 16 illustrates another example in which image data is processed by applying the second embodiment in FIG. 4.

FIG. 15 illustrates an example in which image data is processed by applying the second embodiment in FIG. 4. FIG. 16 illustrates another example in which image data is processed by applying the second embodiment in FIG. 4.

In the example illustrated in FIG. 15, a large rectangle is an image 61 of, for example, 64 pixels×16 pixels. In the example illustrated in FIG. 16, a large rectangle is an image 62 of, for example, 16 pixels×64 pixels and is obtained by rotating the image 61 of 64 pixels×16 pixels clockwise by 90 degrees. In both figures, small rectangles to which numbers of 0 to 1023 are attached are individual pixels 63. In data of the image 61 illustrated in FIG. 15, when the count value is 0, data of the pixels 63 corresponding to the read address 960 to 1023 (see FIG. 14) is read from the main memory 20 and stored in the cache memory 19. At this point, data stored in the cache memory 19 is data of the pixels 63 in a column in data of the image 62 illustrated in FIG. 16. Therefore, efficiency of processing is improved when, for example, processing to rotate an image by 90 degrees is performed.

Values of the first reference value m and the second reference value n are not limited to values of each example described above. By properly setting the values of the first reference value m and the second reference value n with the progress of read addresses, efficiency of processing may be improved. It is preferable to set the second reference value n in such a way that duplicate addresses are not stored in the look-ahead address buffer 18 if possible. In order to read as many addresses as possible in a limited time and to store the addresses in the look-ahead address buffer 18, the valued of n is preferably greater.

Also in the second embodiment, like the first embodiment, a memory access determination circuit may be realized by software. The procedure for memory access determination processing when realized by software will be described below.

Figure 17:
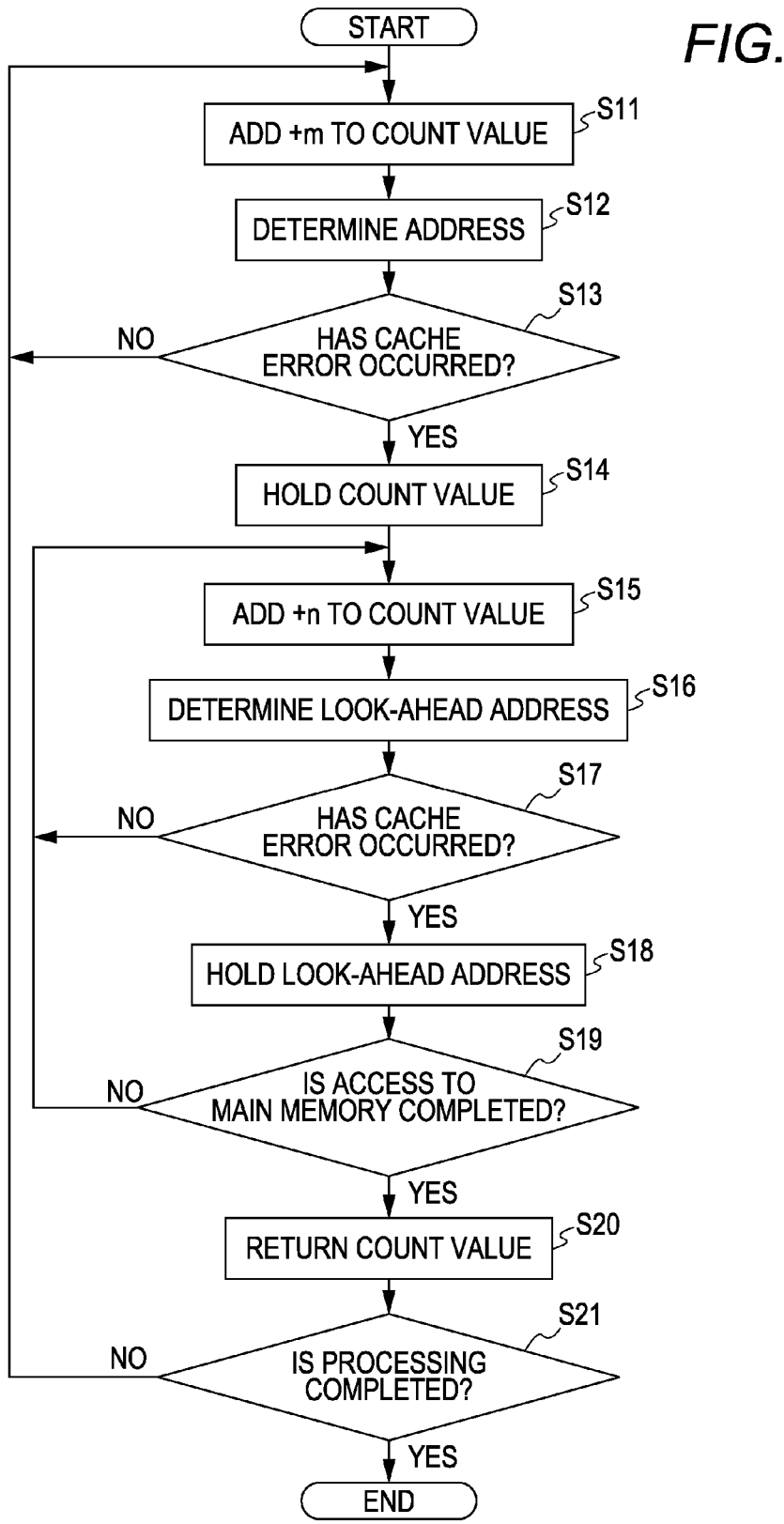
FIG. 17 illustrates a flow chart of the operation in the second embodiment in FIG. 4.

FIG. 17 illustrates a flow chart of the operation in the second embodiment in FIG. 4. As illustrated in FIG. 17, when the memory access determination processing is started, counting starts using the first reference value m (step S11). An address corresponding to the count value is determined by calculation or referring to a lookup table (step S12). A cache determination of the address corresponding to the count value is made (step S13). When a cache hit is determined (step S13: No), data at the address corresponding to the count value m is read from the cache memory 19 and sent to the data processing unit 21. The count value is produced by adding the first reference value m, and the address is determined and the cache determination is made in the similar manner (step S11 to step S13).

When a cache miss is determined at step S13 (step S13: Yes), the count value is held (step S14). Also, processing to read data of the address determined to be a cache miss from the main memory 20 and to store the data in the cache memory 19 is started. During the time before completion of storage of the data in the cache memory 19, the first reference value m is switched to the second reference value n and the count value is produced by adding the second reference value n (step S15). The look-ahead address corresponding to the count value is determined (step S16). A cache determination for the look-ahead address is made (step S17). When a cache hit occurs for the look-ahead address (step S17: No), the count value is produced by adding the second reference value n, and the address is determined and the cache determination is made in the similar manner (step S15 to step S17).

When a cache miss occurs for the look-ahead address (step S17: Yes), the look-ahead address is held by the look-ahead address buffer 18 (step S18). Next, whether a read operation of data from the main memory 20 performed due to an occurrence of a cache miss at step S13 is completed or not is determined (step S19). When the read operation of data from the main memory 20 is not completed (step S19: No), step S15 to step S19 are repeated until the read operation of data is completed. When the read operation of data from the main memory 20 is completed (step S19: Yes), the count value is brought back to the count value held when the first reference value m is switched to the second reference value n (step S20). Whether memory access processing is completed or not is determined (step S21).

When the memory access processing is not completed (step S21: No), the second reference value n is switched to the first reference value m before returning to step S11. In parallel therewith, data corresponding to look-ahead addresses held in the look-ahead address buffer 18 is read from the main memory 20 and stored in the cache memory 19. When the memory access processing is completed at step S21 (step S21: Yes), memory access determination processing terminates. According to the second embodiment, an effect similar to that in the first embodiment may be obtained.

Image data or the like is accessed by hardware optimized for specific image processing, as well as by a processor and therefore, such data frequently has a general data structure. The above embodiments may be applied to a general data structure applied to image data.

According to any one of the embodiments, the cache determination of data having continuity is made faster.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A memory access determination circuit comprising:
a counter that outputs a first value being added a first reference value; and
a control unit that makes a cache determination of an address corresponding to the first value,
wherein, when a cache miss occurs for the address, the counter outputs a second value by adding a second reference value to the first value.

2. The memory access determination circuit according to claim 1, wherein the second reference value is larger than the first reference value.

3. A memory access determination circuit comprising:
a counter that outputs a first value counted by using a first reference value; and
a control unit that makes a cache determination of an address corresponding to an output of the counter,
wherein, when a cache miss occurs for the address, the counter outputs a second value by using a second reference value,
wherein the control unit makes the cache determination of a second address corresponding to the second value in an access period to a memory based on a first address corresponding to the first value and determined to be a cache miss.

4. The memory access determination circuit according to claim 3, wherein, when the cache miss occurs for the first address, the counter holds the first value and changes the output of the counter to the first value in accordance with access conditions to the memory based on the first address.

5. The memory access determination circuit according to claim 3, wherein, when the cache miss occurs for the second address, the control unit holds the second address.

6. The memory access determination circuit according to claim 5, wherein the control unit instructs access to the memory based on the second address in accordance with access conditions to the memory based on the first address.

7. A memory access determination method comprising:
outputting a first value counted being added a first reference value;
making a cache determination of a first address corresponding to the first value;
when a cache miss occurs for the first address, outputting a second value counted being added a second reference value; and
making the cache determination of a second address corresponding to the second value.

8. The memory access determination method according to claim 7, wherein the second reference value is larger than the first reference value.

9. The memory access determination method according to claim 7, wherein the cache determination of the second address is made during an access period to a memory based on the first address.

10. The memory access determination method according to claim 9, wherein when the cache miss occurs for the first address, the first value is held and the cache determination based on the first value is restarted in accordance with access conditions to a main memory based on the first address.

11. The memory access determination method according to claim 9, wherein, when the cache miss occurs for the second address, the second address is held.

12. The memory access determination method according to claim 11, wherein instructions to access the main memory are based on the second address in accordance with access conditions to the main memory based on the first address.

13. An electronic device comprising:
a first memory;
a counter that outputs a first value counted being added a first reference value; and
a control unit that makes a cache determination of an address corresponding to the first value for the first memory, wherein, when a cache miss occurs for the address, the counter outputs a second value counted by adding a second reference value to the first value.

14. The electronic device according to claim 13, wherein the second reference value is larger than the first reference value.

15. The electronic device according to claim 13, comprising:
a second memory,
wherein the control unit makes the cache determination of a second address corresponding to the second value during an access period to the second memory based on a first address corresponding to the first value and determined to be a cache miss.

16. The electronic device according to claim 15, wherein, when the cache miss occurs for the first address, the counter holds the first value and changes the output of the counter to the first value in accordance with access conditions to the second memory based on the first address.

17. The electronic device according to claim 15, wherein, when the cache miss occurs for the second address, the control unit holds the second address.

18. The electronic device according to claim 17, wherein the control unit instructs access to the second memory based on the second address in accordance with access conditions to the second memory based on the first address.

19. A memory access determination circuit comprising:
a counter to output a first value counted by a first reference value;
an address operation circuit to generate an address for accessing a cache memory based on the first value;
a cache determination circuit to make a cache determination of the address and output the request signal to the counter,
wherein the counter outputs a second value counted by adding a second reference value to the first value when receiving the request signal indicating a cache miss for the address.

20. The memory access determination circuit according to claim 1, wherein the counter continues to add the second reference value until an access to a memory based on a first address corresponding to the first value and determined to be a cache miss completes.

* * * * *